United States Patent [19]
Horiuchi et al.

[11] Patent Number: 6,046,545
[45] Date of Patent: Apr. 4, 2000

[54] LIGHT SOURCE APPARATUS USING COAXIAL WAVEGUIDE

[75] Inventors: Hiroshi Horiuchi, Kanagawa; Keiji Fukuzawa, Chiba, both of Japan

[73] Assignees: Sony Corporation, Tokyo, Japan; Fusion Lighting Inc., Rockville, Md.

[21] Appl. No.: 08/597,913

[22] Filed: Feb. 7, 1996

[30] Foreign Application Priority Data

Feb. 14, 1995 [JP] Japan .................................. 7-025234

[51] Int. Cl.[7] .................................................. H01J 65/04
[52] U.S. Cl. ........................................... 315/39; 315/248
[58] Field of Search ........................... 315/39, 248, 267, 315/344

[56] References Cited

U.S. PATENT DOCUMENTS

| | | | |
|---|---|---|---|
| 3,942,058 | 3/1976 | Haugsjaa et al. ................. | 315/39 X |
| 4,001,631 | 1/1977 | McNeill et al. .................... | 315/39 |
| 4,002,944 | 1/1977 | McNeill et al. .................... | 315/39 |
| 5,525,865 | 6/1996 | Simpson ............................ | 315/39 |

*Primary Examiner*—Benny T. Lee
*Attorney, Agent, or Firm*—Frommer Lawrence & Haug, LLP.; William S. Frommer

[57] ABSTRACT

A light source apparatus excites an electrodeless lamp bulb with energy of microwaves generated from a magnetron. A microwave transmission line is improved so that microwaves can be transmitted efficiently and the light source apparatus can be miniaturized. A first cylindrical member is disposed coaxially with a direction in which microwaves generated from the magnetron are transmitted, and a second cylindrical member is disposed at the center of the first cylindrical member, thereby forming a coaxial transmission line. A coaxial oscillator is formed from the position at which the microwaves are generated to a position of ¼ of the wavelength of the microwave. Thus, a special waveguide can be removed.

9 Claims, 5 Drawing Sheets

LIGHT SOURCE APPARATUS USING COAXIAL WAVEGUIDE

BACKGROUND OF THE INVENTION

The present invention relates to a light source apparatus having a plasma light source for emitting light based on a plasma excited by microwaves, and more particularly to a light source apparatus which can be made much smaller.

FIG. 1 of the accompanying drawings shows a light source apparatus.

As shown in FIG. 1, a light source apparatus, generally depicted at reference numeral 1, comprises a magnetron 2, a waveguide 3 connected perpendicularly to the magnetron 2, a coupler 6 for maintaining an impedance match between it and the waveguide 3 and a coaxial resonator 7 interconnected to the coupler 6.

FIGS. 1–5 are related art, that is, they do not constitute prior art but, nevertheless, are related to the present invention. The description of FIGS. 1–5 is helpful in understanding the advantages achieved by the present invention.

The magnetron 2 generates microwaves with a frequency of approximately 2450 MHz. The waveguide 3 is connected to the magnetron 2 at a distance L6 from an end of waveguide 3 and a distance L7 from coupler 6 in the direction perpendicular to the direction in which microwaves are generated, and transmits microwaves generated from the magnetron 2.

The waveguide 3 is in the form of a square cross section directed toward a direction perpendicular to the direction in which microwaves generated from the magnetron 2 are transmitted. The waveguide 3 comprises a first metal rod 4 inwardly extended from the outside and a microwave absorber 5, each of the first metal rod 4 and the microwave absorber 5 disposed at a proper position thereof. The waveguide 3 is electromagnetically interconnected to the coaxial resonator 7 by the coupler 6. The coupler 6 is in the form of wedge, one end thereof, which is connected to the magnetron 2, being formed as a microwave-reflection surface and the other end thereof being thinner than the thickness of the waveguide 3.

The first metal rod 4 is projected into the waveguide 3 and moved into and from the waveguide 3 so as to achieve an optimum load impedance match of the magnetron 2.

Microwave absorber 5 is disposed on each side surface of the waveguide 3 for enabling the magnetron 2 to be operated stably.

The coaxial resonator 7 comprises the wedge-like coupler 6 elongated from the waveguide 3, a second metal rod 8 inwardly extended from the coupler 6, a coupling portion composed of a cylindrical member 9, i.e., a hollow waveguide, an electrodeless lamp bulb 10 in contact with the cylindrical member 9, the electrodeless lamp bulb 10 which is in the form of a ball-like glass container attached to the tip end of the cylindrical member 9 for sealing therein a mercury, or the like, and a cap 11 having many throughholes, i.e., a mesh outer waveguide.

The coupler 6 is extended from the waveguide 3 and is narrow like a wedge as shown in FIG. 1. The cylindrical member 9 has a height L1 and the cap 11 has a height L2, the height L1 and the height L2 being adjusted in such a manner that an impedance, which is obtained when the coaxial resonator 7 is seen from the coupler 6, becomes considerably small. In this situation, the electrodeless lamp bulb 10 is disposed at the position of an antiresonance state so that a situation in which an electric field is largest can be realized. At that time, the height L1 is about ¼ of the wavelength of microwaves. The height L2 is longer than the height L1, resulting in a leakage of a microwave electric power being highly suppressed.

FIG. 2 shows the state of a voltage $\underline{V}$ and a current $\underline{I}$ obtained in the above condition. From FIG. 3, it is easily understood that the impedance, which is obtained when the coaxial resonator 7 side is seen from the coupler 6, is made extremely small.

Returning to FIG. 1, in order to match the impedance of the coupler 6 with respect to the coaxial resonator 7 and a characteristic impedance of the waveguide 3, the wedge-like waveguide is interconnected at its wedge-like opening with a height L4 smaller than the height L3 of the waveguide 3 to the waveguide 3 as a step-down transformer.

The second metal rod 8 is a rod made of metal for adjusting a resonance frequency of the coaxial resonator 7, and is inserted into or withdrawn from the coupler 3 in order to match a resonance frequency of the coaxial resonator 7 with a predetermined frequency.

A material, e.g., mercury, etc., sealed into the electrodeless lamp bulb 10 has to be converted into a plasma, which is thereafter excited to emit light, and therefore it should lie in a strong electric field. To this end, the electrodeless lamp bulb 10 is disposed in the coaxial resonator 7 composed of the cap 11, i.e., the mesh outer waveguide, and the cylindrical member 9 at its position where an electric field is strong.

The electrodeless lamp bulb 10 is forced to be cooled by air 12 which is flowed through the inside of the cylindrical member 9, i.e., the hollow waveguide, as shown by a solid arrow 12 in FIG. 1.

In this manner, energy of microwaves generated from the microwave generation source such as the magnetron 2 is introduced into the waveguide 3. Since the waveguide 3 and the coaxial resonator 7 are interconnected electromagnetically, the impedance is converted into a low impedance and microwaves are supplied from the waveguide 3 to the coaxial resonator 7 to activate a plasma of the material, e.g., the mercury or the like, sealed into the electrodeless lamp bulb 10 disposed within the coaxial resonator 7, thereby emitting light.

Characteristics obtained on the basis of relationship between microwaves generated from the magnetron 2 and the coaxial resonator 7 will be described below with reference to the drawings.

FIG. 3 is a Smith chart showing measured results of impedance of microwaves generated from the magnetron 2 when the frequency of the microwave is variable. Frequency characteristics (frequencies in a continuous range of frequencies between 2340 MHz to 2540 MHz) of the coaxial resonator 7 are illustrated in FIG. 3 for individual frequencies. If a length L5 (see FIG. 1) of the waveguide 3 is varied, then a whole frequency characteristic of the coaxial resonator 7 is rotated about the center of the Smith chart. Specifically, the characteristic of the coaxial resonator 7 is changed by varying the whole length L5 (see FIG. 1) of the waveguide 3. In the example shown in FIG. 3, a wavelength of microwaves transmitted through the waveguide 3 is represented by $\lambda g$, and the length L5 of the waveguide 3 is expressed as:

$$L5 = \lambda g/4 + N \times \lambda g/2 \qquad (1)$$

N being an integer.

From the example shown in FIG. 3, it is easily understood that an oscillation frequency is drawing a clockwise trajectory as the frequency increases.

FIG. 4 is a Smith chart similar to the Smith chart shown in FIG. 3, showing selected frequencies in a continuous range, and showing measured results of load characteristic seen from the magnetron 2 side. From the Smith chart of FIG. 4, it is easily understood that an oscillation frequency is shifted in the counter-clockwise direction and increased with the change of a load impedance. In FIG. 4, a region that is shifted near a reference plane from a center point of the reference plane is a region (UNSTABLE) which an operation becomes unstable at low or high oscillation frequency.

If the characteristic presented by the waveguide 3 side as shown in FIG. 3, the characteristic (characteristic often referred to as a "pulling factor") presented by the magnetron 2 side as shown in FIG. 4, and the load impedance are in combination, then a region in which an operation becomes stable can be deduced from the operation principle.

A manner in which the state of the stable operation is achieved by combining the characteristics shown in FIGS. 3 and 4 will be described below.

Initially, the above region (UNSTABLE) that is shifted near the reference plane from the center point of the reference plane as shown in FIG. 4 should be avoided because it is unavoidably placed in the unstable state (i.e., the region in which oscillation is disabled) at any oscillation frequency.

According to an ideal combination of the above characteristics, the characteristic (see FIG. 4) of the oscillation frequency of microwaves generated from the magnetron 2 is not changed, and the characteristic of the oscillation frequency on the coaxial resonator 7 side can be adjusted by the coaxial resonator 7 side in such a manner that the region is placed above the center point of the reference plane and placed near the reference plane. Concretely, the oscillation frequency has to draw a trajectory placed above the center position of the reference plane and extended along near the reference plane shown in FIG. 4 instead of the clockwise trajectory shown in FIG. 3.

In order to realize such ideal combination, in the above light source apparatus, the length of the waveguide 3 can be finely adjusted equivalently by inserting into the first metal rod 4, which is attached to the upper surface of the waveguide 3, into the waveguide 3 or withdrawing the same from the waveguide 3 shown in FIG. 1. Further, the microwave absorber 5 made of a material capable of absorbing microwaves is disposed on each side surface of the waveguide 3.

FIG. 5 shows an equivalent circuit used to explain the above-mentioned operation principle.

As shown in FIG. 5, the microwave (wavelength of microwaves transmitted through the waveguide 3 is represented by $\lambda g1$) generated from the magnetron 2 is transmitted through the waveguide 3 with the length $L5=(\lambda g1/4+N\times\lambda g1/2)$ and reached to the coupler 6, whereafter it is converted by a voltage-drop transformer (not shown) in the coupler 6 into a low impedance and propagated to the coaxial resonator 7. The length L1 of the coaxial path from the coaxial resonator 7 to the electrodeless lamp bulb 10 is equal to a length of $L1=\lambda g2/4$ and is able to generate a high electric field at an open end. Specifically, the coupler 6, which is coaxial with the electrodeless lamp bulb 10, for generating a plasma is expressed by a circuit of capacitors connected in parallel and a circuit of a resistor and a capacitor connected in series.

However, the light source apparatus 1 interconnects the magnetron 2 and the coaxial resonator 7 by the waveguide 3 to transmit energy of microwaves therethrough. Specifically, a wavelength $\lambda g$ of $TE_{10}$-mode wave that is generally used by the waveguide 3 to transmit energy of microwaves is given by the following equation (2):

$$\lambda g = \lambda/(1-(\lambda/2\cdot a)^2)^{1/2} \quad (2)$$

where $\lambda$ represents a free space wavelength (=c/f) of available frequency, $\lambda g$ a wavelength of the waveguide 3, "a" a lateral dimension (diameter) of the waveguide 3, "c" a velocity of light, i.e., $2.9979\times10^8$ m/s and "f" an operation frequency.

If the operation frequency f=2450 MHz and the lateral dimension "a" of the waveguide 3=100 mm, then the wavelength $\lambda g$ becomes about 155 mm.

As described above, the length L5 from the magnetron 2 to the coaxial resonator 7 has to satisfy the above equation (1) expressed as $L5=\lambda g/4+N\times\lambda g/2$.

Furthermore, in order to interconnect the magnetron 2 and the waveguide 3, a short-circuit surface should be formed at the position of $\lambda g/4$ in a direction opposite to the direction in which the microwaves are transmitted. Accordingly, a required length L5' is given by the following equation (3):

$$L5' = L5 + \lambda g/4 \quad (3)$$
$$= (N+1)\times\lambda g/2$$

Considering the dimensions of the magnetron 2 and the coaxial resonator 7, the required length L5' becomes shortest if N=1. The minimum length of the waveguide 3 is 155 mm which is one wavelength, and this length of the waveguide 3 hinders the light source apparatus 1 from being miniaturized.

The light source apparatus 1 uses the waveguide 3 through which excited microwaves are transmitted to emit light as described above. However, the waveguide 3 is too long, which unavoidably hinders the light source apparatus 1 from being miniaturized. Therefore, the light source apparatus 1 poses a problem that it should be made much smaller while a performance of magnetron 2 is being maintained.

SUMMARY OF THE INVENTION

In view of the aforesaid aspect, it is an object of the present invention to provide a light source apparatus which can be miniaturized while a performance of magnetron is being maintained.

According to the present invention, there is provided a light source apparatus which is comprised of a magnetron with an antenna for generating microwaves, a first cylindrical member attached to the magnetron, the first cylindrical member composed of a cylindrical housing and an extended portion with a diameter smaller than that of the cylindrical housing, a second cylindrical member attached to the antenna of the magnetron and disposed coaxially with the first cylindrical member, an electrodeless lamp bulb disposed near a free end of the second cylindrical member, and a cap having many through-holes attached to the extended portion so as to cover the electrodeless lamp bulb, wherein the second cylindrical member comprises a base having a length of approximately ¼ of a wavelength of the microwaves and a remaining portion with a diameter larger than that of the base for forming a coaxial resonator.

According to the present invention, the extended portion of the first cylindrical member includes a metal rod inwardly fitted into the extended portion for adjusting a resonance frequency and a projected amount of the metal rod into the extended portion can be adjusted freely.

Further, according to the present invention, the housing of the first cylindrical member includes a metal rod inwardly fitted into the housing for adjusting a phase a projected amount of the metal rod into the housing can be adjusted freely.

Furthermore, the second cylindrical member is supported at a center of the first cylindrical member by insulating disks disposed on the housing and the extended portion of the first cylindrical member.

In the light source apparatus according to the present invention, a special waveguide can be removed, and the coaxial transmission line is composed of the first and second cylindrical members in a direction in which microwaves generated from the magnetron are transmitted. The coaxial resonator is disposed in this coaxial transmission line, and hence the light source apparatus can be made much smaller.

The base of the second cylindrical member is connected to the antenna through which microwaves generated from the magnetron are transmitted. The base has a length of approximately ¼ of a wavelength of microwave, and the coaxial resonator is formed in the elongated remaining portion.

According to the above arrangement, impedances can be matched based on a difference between a diameter of the housing of the first cylindrical member, a diameter of the extended portion with the diameter smaller than that of the housing and a diameter of the second cylindrical member.

Figure 1:
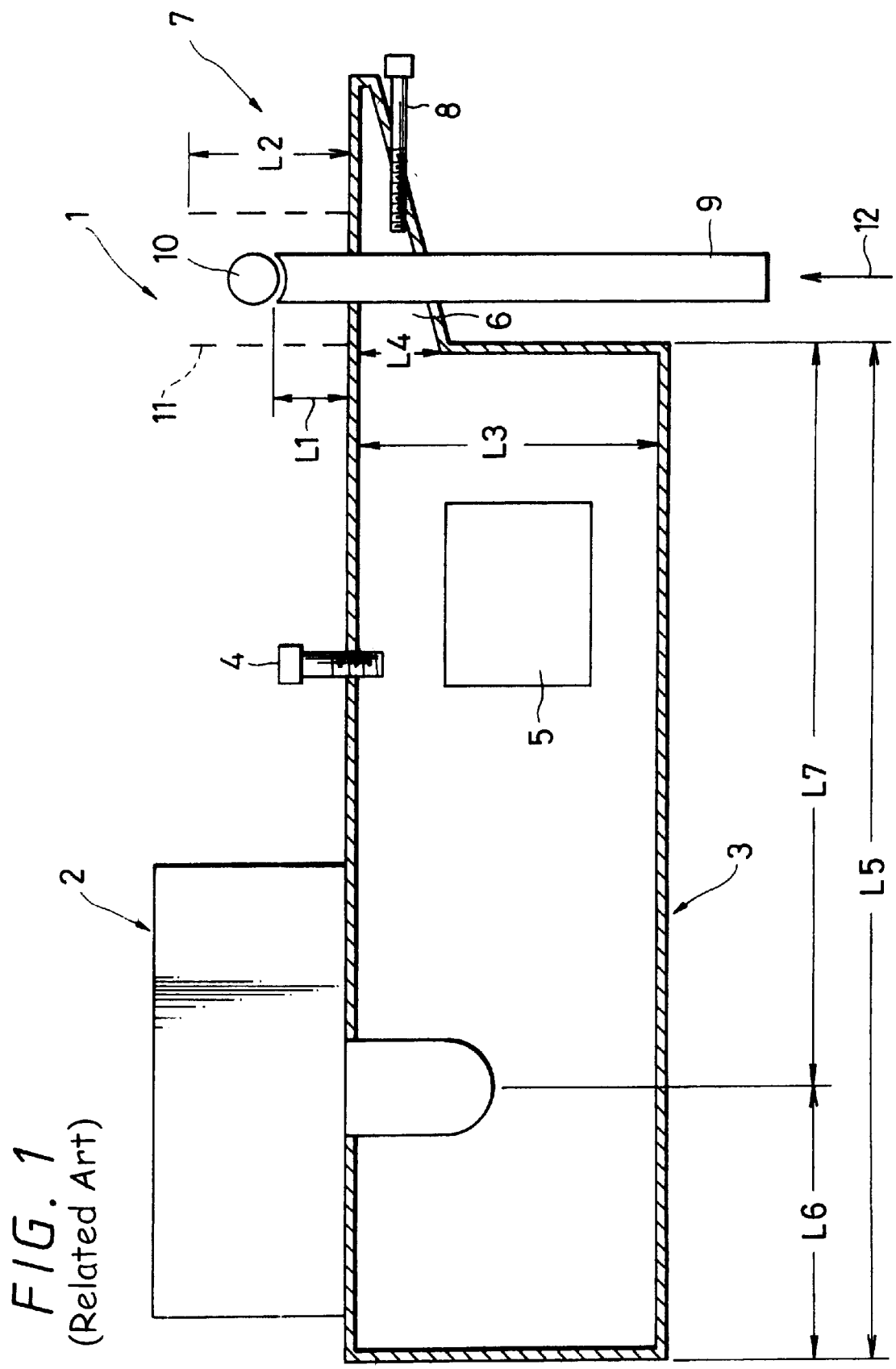
FIG. 1 is an elevational view, partly in cross section, illustrating a coaxial resonator of a related art light source apparatus using a waveguide.
Figure 2:
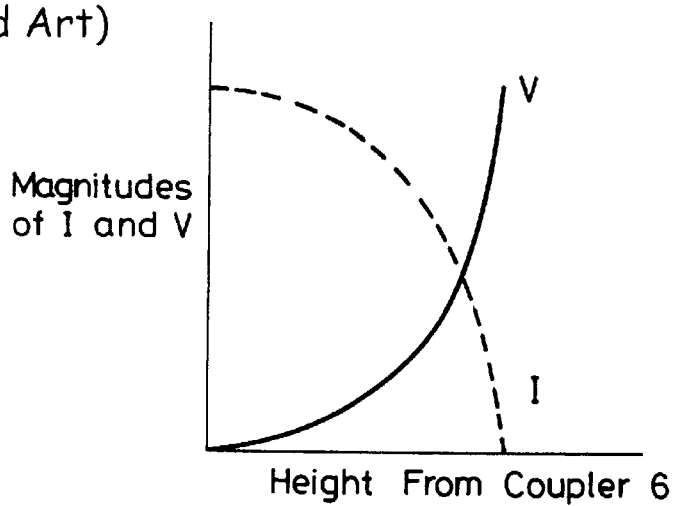
Figure 3:
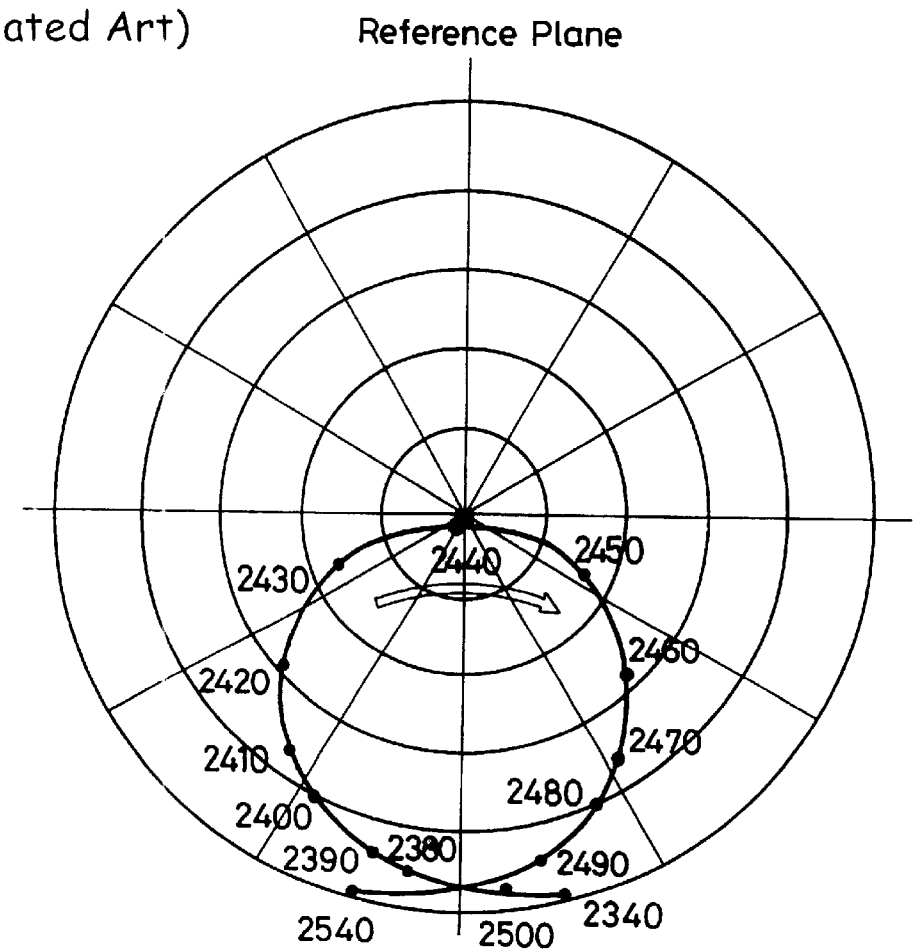
Figure 4:
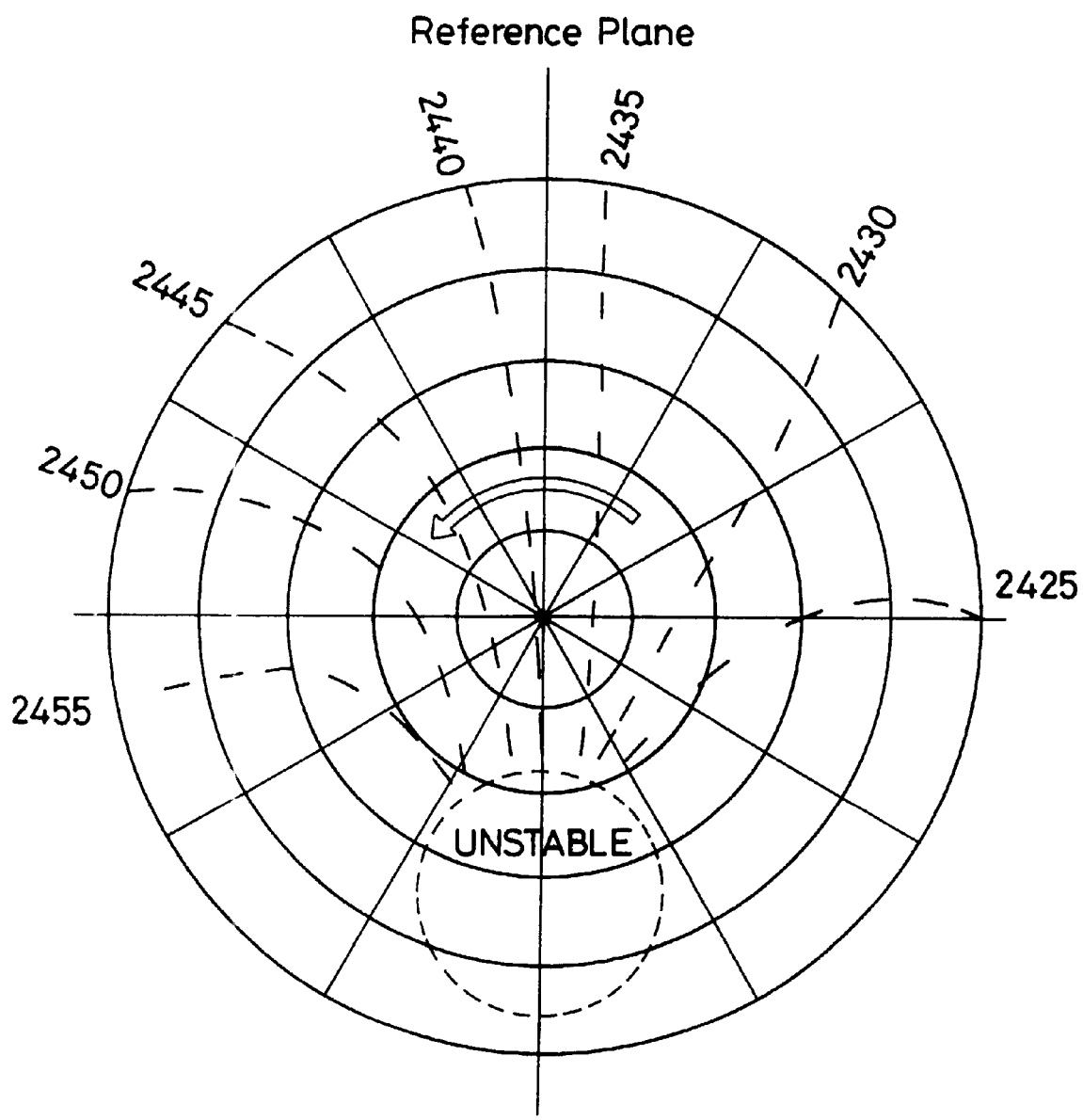
Figure 5:
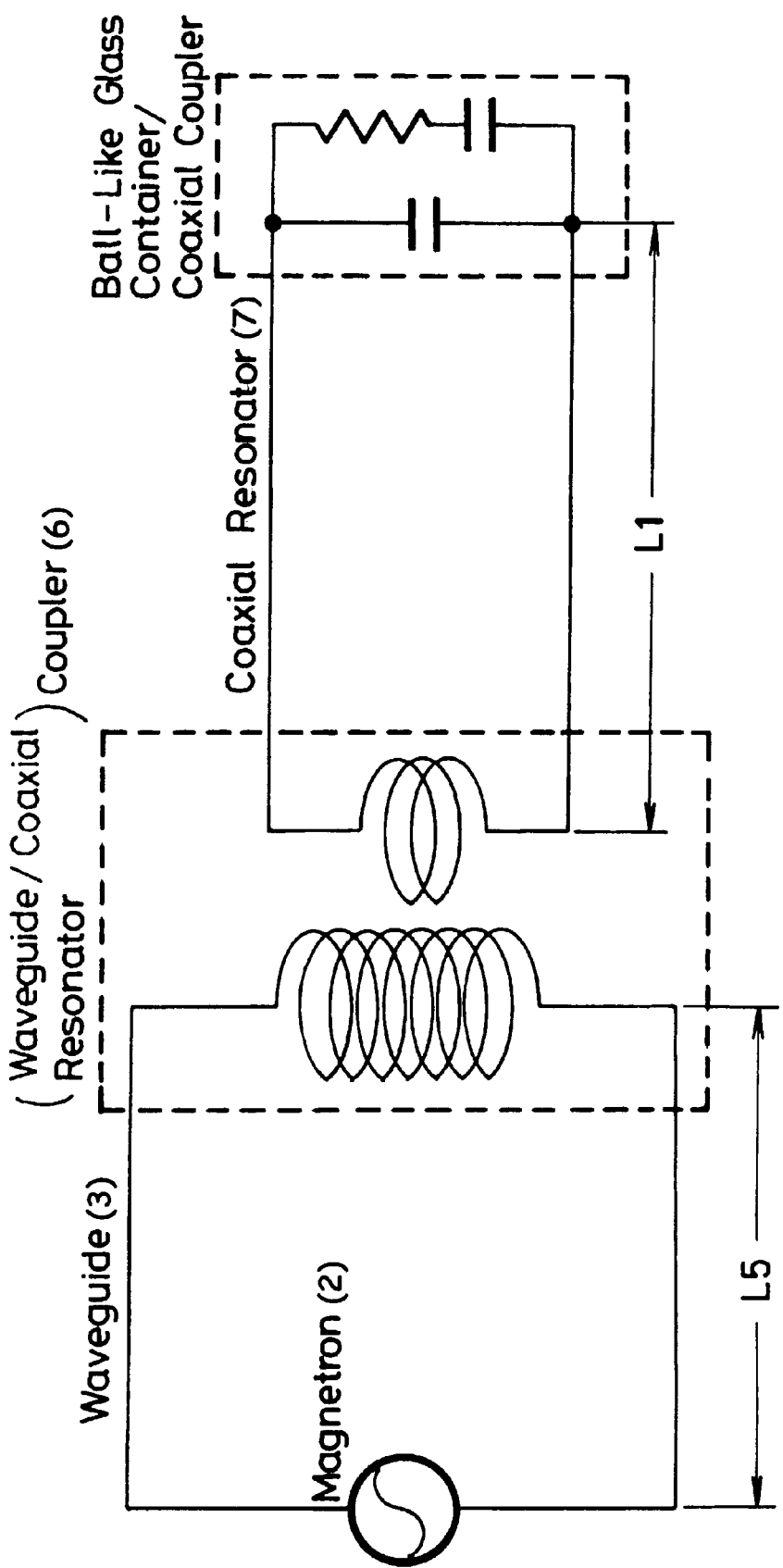
Figure 6:
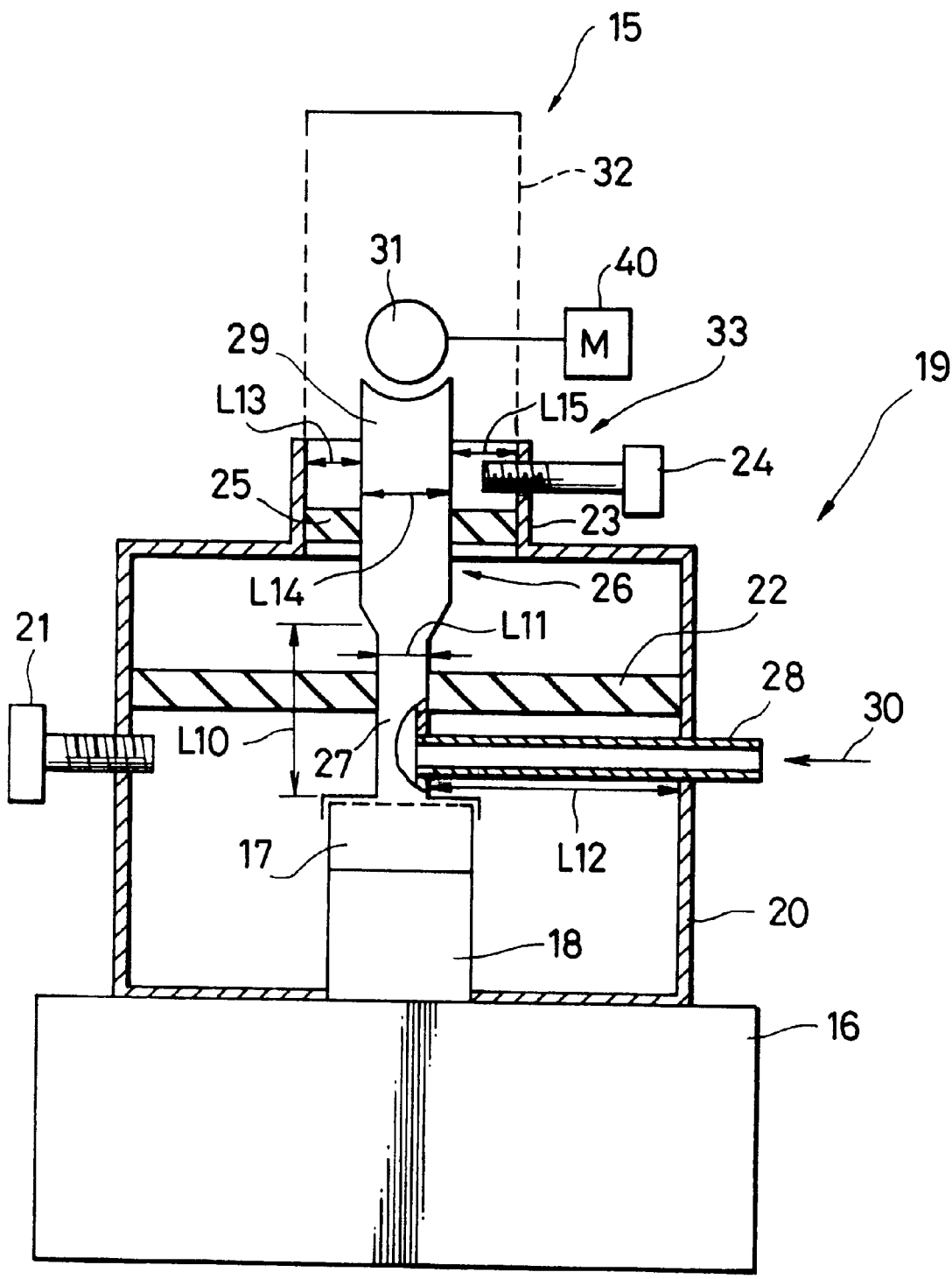

FIG. a diagram showing a distribution of a current and a voltage of the coaxial resonator in the related art light source apparatus shown in FIG. 1;

FIG. 3 is a Smith chart showing a frequency characteristic of an impedance of the related art coaxial resonator shown in FIG. 1;

FIG. 4 is a Smith chart showing a frequency characteristic of a load impedance which is seen from the side of the magnetron the related art shown in FIG. 1;

FIG. 5 is a diagram of an equivalent circuit of the related art light source apparatus using the waveguide shown in FIG. 1 for generating microwaves; and FIG. 6 is an elevational view, partly in cross section, illustrating a light source apparatus according to the present invention.

DETAILED DESCRIPTION OF THE PREFERRED EMBODIMENT

A light source apparatus according to the present invention will be described with reference to FIG. 6. The operation principle of the light source apparatus, e.g., adjustment of phase of impedance and resonance frequency has been described so far and therefore need not be described below.

FIG. 6 is an elevational view, partly in cross section, used to explain a principle of a light source apparatus according to the present invention.

As shown in FIG. 6, a light source apparatus, generally denoted at reference numeral 15, comprises a magnetron 16 for generating microwaves, an antenna 18 having a metal cap 17 through which energy of microwaves is transmitted, the antenna 18 connected to the magnetron 16 at the center of a first cylindrical member 19, the first cylindrical member 19 composed of a cylindrical housing 20 with the antenna 18 at its center and an extended portion 23 with a diameter smaller than that of the housing 20, the first cylindrical member 19 forming a first transmission line, a second cylindrical member 26 of a second transmission line attached to the metal cap 17 and disposed coaxially with the first cylindrical member 19, an electrodeless lamp bulb 31 disposed near a free end of the second cylindrical member 26 and a cap 32 having many through-holes attached to the extended portion 23 of the first cylindrical member 19 for covering the electrodeless lamp bulb 31.

The magnetron 16 is so designed as to generate microwaves of approximately 2450 MHz through the antenna 18 covered with the metal cap 17.

The first cylindrical member 19 is disposed in a direction in which microwaves are generated from the magnetron 16 through the antenna 18 connected to the magnetron 16. The first cylindrical member 19 is also interconnected directly to the antenna 18 so as to serve as an internal transmission line. The first cylindrical member 18 comprises the housing 20 with a predetermined diameter and the extended portion 23 with a diameter smaller than that of the housing 20.

The housing 20 includes a first metal rod 21 inwardly slidably fitted into the housing 20 and a first insulating disk 22 for supporting a base of the second cylindrical member 26 at the center of the housing 20.

The first metal rod 21 adjusts the amount projected into the housing 20 when it is being turned, and can adjust a phase of an impedance that is seen from the magnetron 16, similarly as described before.

The first insulating disk 22 is in the form of disk, and made of an insulating material with an extremely small dielectric loss, such as Teflon or Derlin resin. The first insulating disk 22 supports a base 27 of the second cylindrical member 26 at the center of the first cylindrical member 19.

The extended portion 23 is smaller in diameter that the housing 20, and functions as a step-down transformer. The extended portion 23 comprises a second metal rod 24 inwardly fitted into the extended portion 23 and a second insulating disk 25 for supporting a remaining portion 29 of the second cylindrical member 26 at the center of the extended portion 23.

The second metal rod 24 is loosely inwardly fitted into the extended portion 23 of the second cylindrical member 26, and adjusts the amount projected into the inside space of the extended portion 23 when it is being turned. The second metal rod 24 is able to adjust a resonance frequency of microwaves transmitted through the remaining portion 29 of the second cylindrical member 26. The second metal rod 24 have been described so far in detail and therefore will not be described below.

The second insulating disk 25 is in the form of a disk, and made of an insulating material with an extremely small dielectric loss, such as Teflon or Derlin resin similarly to the first insulating disk 22. The second insulating disk 25 supports the remaining portion 29 of the second cylindrical member 26 at the center of the first cylindrical member 19.

In this manner, the second cylindrical member 26 is coaxially disposed at the center of the first cylindrical member 19 by the first and second insulating disks 22, 25, thereby forming a microwave coaxial transmission line.

The second cylindrical member 26 comprises the base 27 having a length of approximately ¼ of the wavelength of microwave, the remaining portion 29 with a diameter larger than that of the base 27 thereby a coaxial resonator 33, and the second metal rod 24 inwardly extended toward the remaining portion 29.

The base 27 is in the form of cylinder, and has a length L10 which is approximately ¼ of a wavelength λ of microwave as it is measured from the metal cap 17 connected to the antenna 18. The base 27 thus formed so far has a diameter L11 which is sufficiently smaller than that of the housing 20 of the first cylindrical member 19. Specifically, the diameter L11 of the base 27 and a length L12 extending from the outer surface of the base 27 to the inner surface of the housing 20 of the first cylindrical member 19 are selected so as to satisfy an inequality of L11<L12. Since the above inequality is satisfied and the second cylindrical member 26 is disposed at the center of the antenna 18, a relatively high characteristic impedance can be obtained at the base 27 of the second cylindrical member 26.

A cooling pipe 28 is made of an insulating material with an extremely small dielectric loss, and perpendicularly coupled to the base 27 for cooling the electrodeless lamp bulb 31 through the base 27 and the remaining portion 29 of the second cylindrical member 26 with an air flowed as shown by a solid arrow 30.

The remaining portion 29 is a hollow waveguide, and serves as a resonator of the coaxial resonator 33. The remaining portion 29 is elongated from the base 27 of the second cylindrical member 26, and has a diameter L14 which is larger than the diameter L11 of the base 27. The diameter L14 of the remaining portion 29 is equal to ⅓ of the diameter of the extended portion 23 of the first cylindrical member 19. The remaining portion 29 is fixed to the center of the extended portion 23 by the second insulating disk 25. As shown in FIG. 6, a length L13 from the inner surface of the first cylindrical member 19 to the outer surface of the remaining portion 29, the diameter L14 of the remaining portion 29 and a length L15 from the outer surface of the remaining portion 29 to the inner surface of the extended portion 23 satisfy a relationship expressed as L13=L14=L15. In this manner, characteristic impedances of the first and second transmission lines (first and second cylindrical members 19, 26) can be matched with each other based on a difference between the inner diameter of the first cylindrical member 19 and the outer diameter of the resonator (remaining portion 29) of the second cylindrical member 26.

The electrodeless lamp bulb 31 is in the form of a ball-like container with a volatile substance, such as mercury or filler gas filled up and sealed thereto. The electrodeless lamp bulb 31 is rotated by a motor (M) 40 in order to uniformly receive the microwaves. The volatile substance filled in the electrodeless lamp bulb 31 is not limited to the mercury and may, of course, be other suitable substances such as argon.

The cap 32 having many through-holes is in the form of mesh cap, and coupled at its base to a free end of the extended portion 23. The cap 32 is so designed as to finally receive microwaves generated from the magnetron 16 and to pass light beams generated from the electrodeless lamp bulb 31.

The coaxial resonator 33 will be described below. The coaxial resonator 33 is formed from the position at which the length L10 is extended from the metal cap 17 which generates microwaves, i.e., the position at which the length is approximately ¼ of the wavelength of the microwave. The coaxial resonator 33 comprises the extended portion 23 with the reduced diameter elongated from the housing 20 of the first cylindrical member 19 for achieving impedance matching, the remaining portion 29 of the hollow waveguide of the second cylindrical member 26, the second insulating disk 25 for supporting the remaining portion 29 at the center of the first cylindrical member 19, the second metal rod 24 for adjusting a resonance frequency, the electrodeless lamp bulb 31 of ball-like glass container with a volatile substance such as mercury filled up and sealed therewith, connected to the free end of the remaining portion 29 and the cap 32 having the through-holes.

With such an arrangement, the coaxial transmission line with the length of approximately ¼ of the wavelength of microwave, i.e., the coaxial transmission line comprising the housing 20 of the first cylindrical member 19 and the base 27 of the second cylindrical member 26 is formed instead of the conventional waveguide. Therefore, the light source apparatus according to the present invention does not require a special waveguide, efficiently transmits microwaves, and can be miniaturized.

A characteristic impedance Z0 of the coaxial transmission line composed of the first and second cylindrical members 19, 26 is given by the following equation (4):

$$Z0 = \log_e(b/a) \times Zw/(2\pi) \tag{4}$$

where Z0 represents a characteristic impedance of the coaxial transmission line, Zw an impedance inherent in a medium, "a" a radius of the first cylindrical member 19 forming the coaxial transmission line, and "b" a radius of the second cylindrical member 26 forming the coaxial transmission line.

If a characteristic impedance of the coaxial transmission line composed of the first cylindrical member 19 directly connected to the magnetron 16 and the second cylindrical members 26 is represented as $z_{01}$, an inner radius of the first cylindrical member 19 is represented as $b_1$, a radius of the second cylindrical member 26 is represented as $a_1$, a characteristic impedance of the transmission line forming the coaxial resonator 33 is represented as $Z_{02}$, an inner radius of the cap 32 with many through-holes is represented as $b_2$ and an outer radius of the remaining portion (hollow waveguide) 29 of the second cylindrical member 26 is represented as $a_2$, then a ratio "m" between the characteristic impedance $Z_{01}$ of the coaxial transmission line composed of the housing 20 of the first cylindrical member 19 directly connected to the magnetron 16 and the base 27 of the second cylindrical member 26 and the characteristic impedance $Z_{02}$ of the transmission line of the coaxial resonator 33 composed of the extended portion 23 of the first cylindrical member 19 and the remaining portion 29 of the second cylindrical member 26 is expressed by the following equation (5):

$$m = Z_{01}/Z_{02} = \log_e(b_1/a_1)/\log_e(b_2/a_2) \tag{5}$$

A study of the above equation (5) shows that the step-down transformer can be realized by selecting $(b_1/a_1)$ and $(b_2/a_2)$. Therefore, with the above arrangement, microwaves generated from the magnetron 16 can be transmitted to the coaxial resonator 33.

As described above, in the light source apparatus according to the present invention, the first cylindrical member with the antenna at its center is disposed in the direction in which microwaves are transmitted from the antenna of the magnetron which generates the microwaves. The second cylindrical member is coaxially disposed at the antenna position, i.e., at the center of the first cylindrical member thereby to form the coaxial transmission line. The coaxial resonator is connected to the base with the length substantially ¼ of the wavelength of the microwave from the position at which microwaves are generated. Therefore, microwaves can be efficiently transmitted to the coaxial resonator, and the light source apparatus according to the present invention does not need a special waveguide. Thus, the light source apparatus according to the present invention can be miniaturized.

Furthermore, since the light source apparatus according to the present invention includes the metal rod for adjusting a resonance frequency and another metal rod for adjusting a phase, the light source apparatus thus miniaturized can use microwaves highly efficiently.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A light source apparatus comprising:

a magnetron with an antenna for generating microwaves;

a first cylindrical member attached to said magnetron, said first cylindrical member composed of a cylindrical housing and an extended portion extending from said cylindrical housing, said extended portion having a diameter smaller than a diameter associated with said cylindrical housing;

a second cylindrical member attached to said antenna of said magnetron and disposed coaxially with respect to said first cylindrical member;

an electrodeless lamp bulb disposed near a free end of said second cylindrical member; and a cap having through-holes attached to said extended portion so as to cover said electrodeless lamp bulb, wherein said second cylindrical member comprises a base and a remaining portion, said base situated within said cylindrical housing and having a length of approximately ¼ of a wavelength at a microwave frequency, said remaining portion comprising a coaxial resonator extending from said base into said extended portion, said remaining portion having a diameter larger than a diameter associated with said base.

2. A light source apparatus as claimed in claim 1, wherein said extended portion of said first cylindrical member includes a metal rod adjustably extendable into said extended portion for adjusting a resonance frequency of said microwaves.

3. A light source apparatus as claimed in claim 1, wherein said cylindrical housing of said first cylindrical member includes a metal rod adjustable extendable into said housing for adjusting a phase of said microwaves.

4. A light source apparatus as claimed in claim 1, wherein said second cylindrical member is supported at a center of said first cylindrical member by insulating disks disposed on said cylindrical housing and said extended portion of said first cylindrical member, respectively.

5. A light source apparatus as claimed in claim 1, wherein said base of said second cylindrical member is significantly smaller than said remaining portion such that said base generates a relatively high characteristic impedance.

6. A light source apparatus as claimed in claim 1, wherein the diameter of said remaining portion is equal to the distance between the extended portion and said remaining portion.

7. A light source apparatus as claimed in claim 6, wherein the diameter of said remaining portion is ⅓ the diameter of said extended portion.

8. A light source apparatus as claimed in claim 1, wherein said extended portion is a step-down transformer.

9. A light source apparatus as claimed in claim 1, further comprising motor means coupled to said electrodeless lamp bulb for rotating said electrodeless lamp bulb.

* * * * *